United States Patent [19]
Koumura et al.

[11] Patent Number: 5,574,598
[45] Date of Patent: Nov. 12, 1996

[54] VARIFOCAL LENS

[75] Inventors: Tukasa Koumura, Toyota; Michio Hisanaga, Nagoya; Tadashi Hattori, Okazaki, all of Japan

[73] Assignee: Nippondenso Co., Ltd., Kariya, Japan

[21] Appl. No.: 286,560

[22] Filed: Aug. 5, 1994

[30] Foreign Application Priority Data

Aug. 5, 1993 [JP] Japan .................................. 5-194721

[51] Int. Cl.$^6$ .............................. G02B 1/06; G02B 3/12; G02B 15/14
[52] U.S. Cl. ........................................... 359/666; 359/676
[58] Field of Search ..................................... 359/666, 676

[56] References Cited

U.S. PATENT DOCUMENTS

| | | | |
|---|---|---|---|
| 3,598,479 | 8/1971 | Wright | 359/666 |
| 4,859,041 | 8/1989 | Suda | 359/676 |
| 5,443,506 | 8/1995 | Giarabet | 359/666 |

FOREIGN PATENT DOCUMENTS

| | | | |
|---|---|---|---|
| 55-36857 | 3/1980 | Japan . | |
| 60-220301A | 11/1985 | Japan | 359/666 |
| 5157903 | 6/1993 | Japan . | |

OTHER PUBLICATIONS

Sato, et al: "Deformable 2–D mirror using multilayered electrostrictors"; Applied Optics, vol. 21, No. 20, Oct. 15, 1982—pp. 3669–3672.

Primary Examiner—Georgia Y. Epps
Assistant Examiner—Jacqueline M. Steady
Attorney, Agent, or Firm—Cushman, Darby & Cushman

[57] ABSTRACT

A varifocal lens whose variable focal length can be controlled by, for example, an electric signal, and suitable for use in bar code readers, etc. A varifocal lens comprises a first pressure chamber defined between a glass substrate and a transparent elastic film. The transparent elastic film is faced to the surface of the planar glass substrate having parallel surfaces with a spacer incorporated therebetween to provide the first pressure chamber. A pump is provided adjacent to the first pressure chamber via a communicating path for charging an operating liquid to the first pressure chamber from a second pressure chamber of the pump by electrically deforming the transparent elastic film to form a lens having a variable focal length. The transparent elastic film has a film thickness distribution as such to provide a spherical plane in the central portion thereof and a third order curved surface in the periphery thereof. In this manner, a lens free of aberration can be obtained when a liquid is fed into the first pressure chamber to form a spherical plane.

14 Claims, 4 Drawing Sheets

VARIFOCAL LENS

BACKGROUND OF THE INVENTION

The present invention relates to a varifocal lens which is controllable in focal length and suitable for use in, for example, bar code readers.

Various types of varifocal lenses having a controllable focal length have been proposed in related art. For instance, JP-A-55-36857 (unexamined publication of Japanese patent application) discloses a structure comprising a functional liquid such as silicone oil enclosed in an airtight chamber defined between a pair of transparent elastic films faced to each other with a predetermined spacing provided therebetween. In this varifocal lens, pressure is applied to the operating liquid charged inside the chamber defined between the pair of transparent elastic films to deform the transparent elastic films into a convex shape. In this manner, for example, a convex lens having a bulged center portion can be obtained.

The morphology of such lens as described above changes depending on the rigidity of the transparent elastic films. In a case where the flexural rigidity is predominant in the transparent elastic films, the films undergo deformation to give a fourth order curved plane. In a case where tensile strength is predominant, the transparent elastic films deform to yield a spherical shape.

The varifocal lens must have a quick response from the viewpoint of making it suitable for various applications. Quick response varifocal lenses can be achieved by using a highly rigid material. However, because of the pressure applied to the operating liquid, the use of transparent elastic films made of a rigid material results in the formation of a lens having a fourth order curved surface. The formation of such a lens leads to the generation of aberrations which make it difficult to read, for example, bar codes.

SUMMARY OF THE INVENTION

It is an object of the present invention to provide a varifocal lens having a variable focal length which obviates the drawbacks of the conventional varifocal lens.

It is a further object of the present invention to provide a varifocal lens that is controlled by a pressure chamber defined by a pair of transparent films and filled with an operating liquid which applies pressure to the transparent films to elastically deform the films, provided that the shape of the deformed transparent films is optimized in such a manner to minimize the lens aberration.

The varifocal lens according to the present invention comprises a first and a second transparent films at least one of which is made of an elastic material. The first and second transparent films are arranged in parallel with each other with a predetermined spacing therebetween. The operating liquid that is sealed inside the chamber has a refractive index equivalent to that of the first and second transparent films. At least one of the transparent films made of an elastic material is variably deformed by controlling the pressure applied to the transparent film using a pumping means to control said operating liquid. Film thickness distribution can be set in such a manner that the radius of curvature in the center portion may differ from that in the peripheral portion.

In the varifocal lens of the above construction, various types of lenses can be provided by changing the shape of the transparent films, in particular, those made of the elastic material. The shape of the transparent films is controlled by applying variable pressure according to operating liquid placed between the first and the second transparent films. If a highly rigid material is used to form the transparent film made of the elastic material, the deformed film yields a fourth order curved shape which leads to the generation of lens aberration. However, if the transparent film made of an elastic material comprises such a distribution in film thickness as to yield a radius of curvature in the center portion differing from that in the peripheral portion, the film deformed into a fourth order curved shape can be modified to yield a lens having a variable focal length yet which is free of aberrations.

DETAILED DESCRIPTION OF THE PREFERRED EMBODIMENTS

The present invention is described in further detail below in terms of presently preferred embodiments according to the present invention, with reference to the accompanying drawings. It should be understood, however, that the present invention is not to be construed as being limited to the embodiments described hereinafter.

Figure 1A:
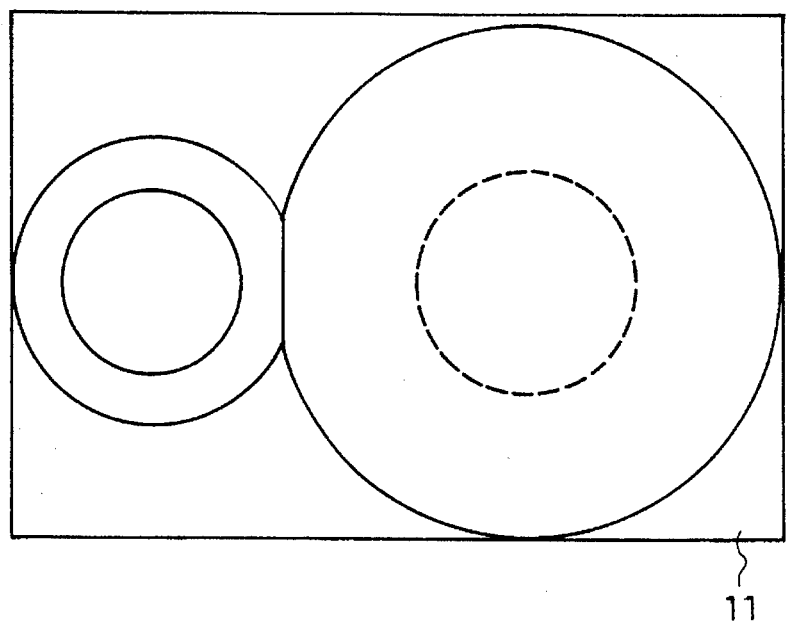
FIGS. 1A and 1B are schematic views showing a varifocal lens according to an embodiment of the present invention, FIG. 1A being a plan view and FIG. 1B being a cross-sectional view thereof.
Figure 1B:
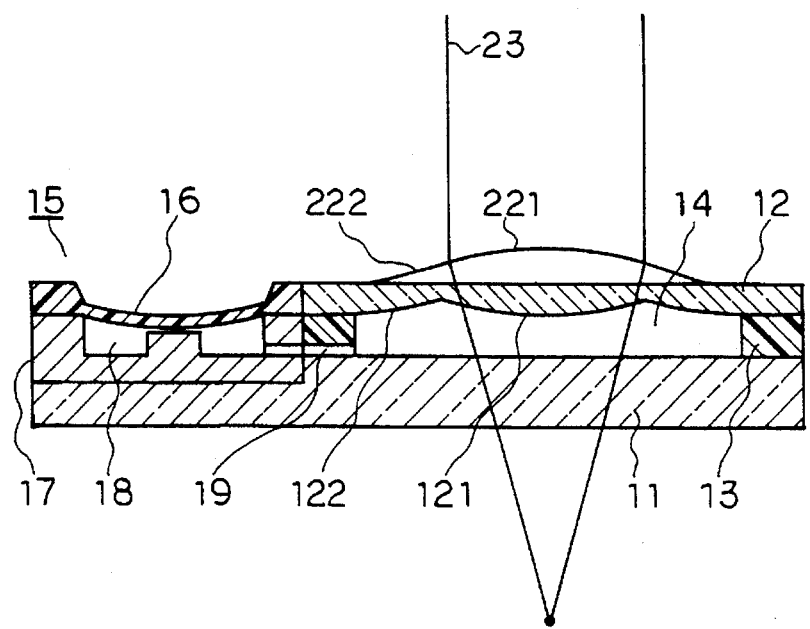

Referring to FIGS. 1A and 1B, a varifocal lens according to an embodiment comprises a glass substrate 11 having upper and lower planar surfaces parallel with each other, and a transparent elastic film 12 provided above a surface of the glass substrate 11 with a predetermined gap therefrom. The transparent elastic film 12 must be a thin film having a film thickness distribution such that it may yield a first curved plane 121 in the central portion and a second curved plane 122 around the peripheral portion of the first curved plane 121.

The outer peripheral portion of the transparent elastic film 12 is joined with the surface of the glass substrate 11 by means of a ring-like spacer 13 made of, for example, silicone. Thus, a pressure chamber 14 surrounded by the spacer 13 is established between the glass substrate 11 and the transparent elastic film 12.

Figure 2:
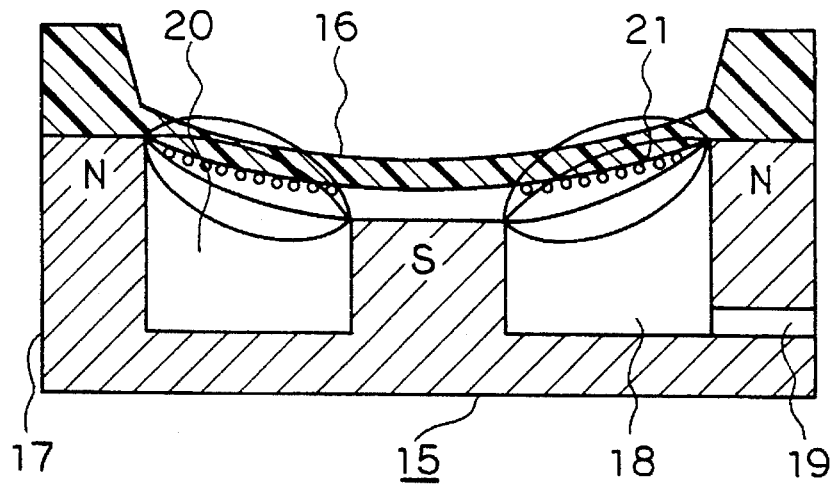
FIG. 2 is a cross sectional view showing the structure of a pump portion for the operating liquid according to the above embodiment of the present invention.

A pump 15 common to the glass substrate 11 is provided adjacent to the pressure chamber 14. Referring to the enlarged view shown in FIG. 2, the pump 15 comprises a thin elastic film 16 made of an insulator. The outer periphery of the elastic film 16 is joined to the outer periphery of a yoke 17 which constitutes a magnetic circuit formed into a cylindrical vessel having a bottom plane. A pressure chamber 18 is formed in this manner inside the yoke 17.

The pressure chamber 18 communicates with the pressure chamber 14 defined by the transparent elastic film 12 via a communicating path 19. The pressure chambers 14 and 18 are filled with an operating liquid 20 such as silicone oil, having the same refractive index as that of the transparent elastic film 12 and the glass substrate 11.

The yoke 17 comprises a cylindrical outer peripheral portion to which the outer periphery of the elastic film 16 is joined, and a center pole provided in such a manner that the front or upper edge thereof may be brought into the vicinity of the elastic film 16. As illustrated in the figure, the cylindrical outer periphery of the yoke 17 functions as N pole, and the center pole functions as S pole. A helical sheet coil 21 is formed on the inner surface of the pressure chamber 18 of the elastic film 16 in such a manner that the center pole may be surrounded thereby.

A DC electric current is supplied selectively to the sheet coil 21. The elastic film 16 undergoes deformation because it is attracted to the center pole inside the yoke 17 due to the Lorentz's force generated by the interaction between the current and the magnetic force of the yoke 17. The volume of the pressure chamber 14 is decreased in this manner. Accordingly, the operating liquid 20 is sent from the pressure chamber 18 to the chamber 14 via the communicating path 19 by the pressure applied to the operating liquid 20. The transparent elastic film 12 is then pushed upward to form curved faces 221 and 222 as shown in FIG. 1B.

The curved faces 221 and 222 then function as a lens. Accordingly, laser light 23 radiated thereonto is focused in the manner shown in FIG. 1B. The focal length depends on the quantity of the operating liquid 20 that is provided by the pump 15. This signifies that the focal length of the lens can be controlled by the magnitude of electric current supplied to the sheet coil 21 of the pump 15.

As the pressure of the operating liquid 20 inside the pressure chamber 14 increases to deform the transparent elastic film 12 to give curved faces 221 and 222, the curved surface 221 in the central portion provides a spherical shape due to the film thickness distribution of the curved surfaces 121 and 122. Thus, the lens aberration of a lens formed in this manner can be improved over that of a conventional lens having no film thickness distribution. This can be seen clearly in Table 1 below.

TABLE 1

| Present Embodiment (I) | | | Prior art (II) | |
|---|---|---|---|---|
| Pressure [Pa] | Focal length [mm] | spot size [μm] | Focal length [mm] | Spot size [μm] |
| 40 | 619.8 | 63.9 | 22.5 | 202.4 |
| 50 | 495.9 | 30.2 | 577.5 | 201.2 |
| 64 | 387.3 | 31.0 | 451.1 | 200.9 |
| 70 | 353.9 | 32.1 | 412.4 | 201.4 |

(I) With film thickness distribution.
(II) A uniform film thickness of 20 μm.

The optimal film thickness distribution for the transparent elastic film 12 is derived as explained below.

Figure 3:
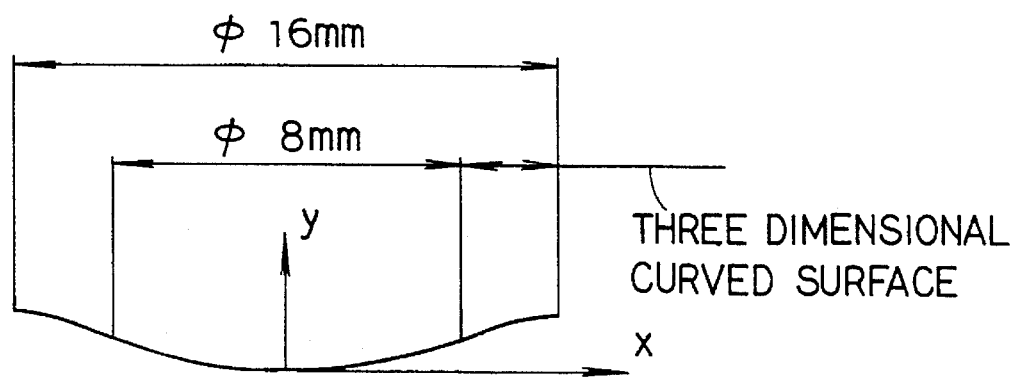
FIG. 3 is a cross sectional view for explaining the shape of a deformed transparent elastic film constituting the lens with reference to FIGS. 1A and 1B.

Referring to FIG. 3, consideration is given to a certain focus length, for example, 400 mm in this case. The deformed morphology for the transparent elastic film 12 is set to an ideal shape. For instance, the central portion of the transparent elastic film 12 is considered to have a spherical morphology expressed by Equation (1) below, and the peripheral portion thereof is set as a third order curved plane expressed by Equation (2) in such a manner that the boundary conditions may be satisfied in both the spherical plane and the peripheral portion. The pressure of the operating liquid 20 is set to 54 Pa.

Figure 4:
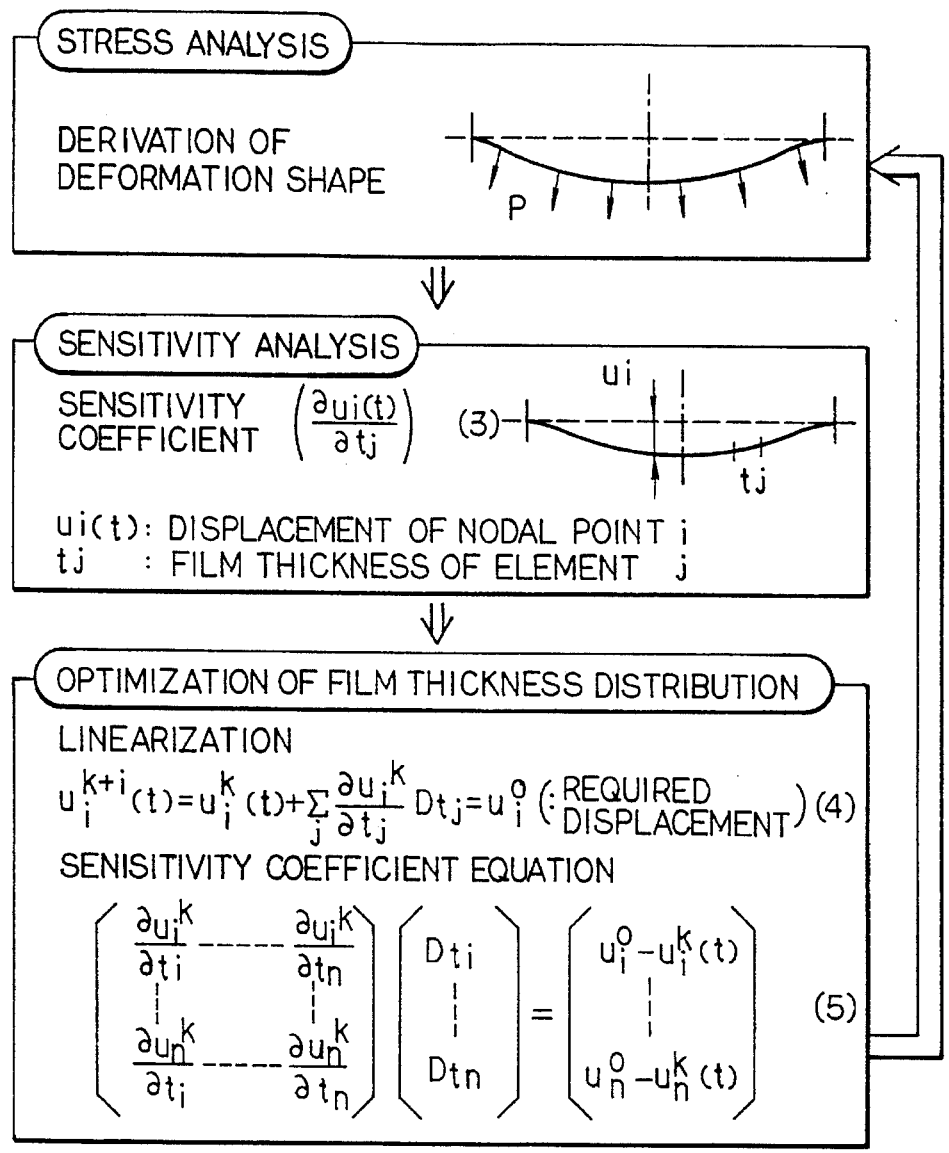
FIG. 4 is a diagram for explaining the calculation scheme for determining the optimal film thickness distribution of a transparent elastic film.

Equation for the spherical plane:

$$y = R - (R^2 - x^2)^{1/2} \tag{1}$$

where R=200 mm (equivalent to f=400 mm)
Equation for the third order curved plane:

$$y = a_0 + a_1 x + a_2 x^2 + a_3 x^3 \tag{2}$$

where,
$a_0 = -0.80064$
$a_1 = 0.40032$
$a_2 = -0.002505$
$a_3 = 2.5 \times 10^{-7}$ Thus, a film thickness distribution is provided as such to the transparent elastic film 12 that the deformed shape as defined above is realized when pressure is applied to the transparent elastic film 12 in the pressure chamber 14 by the operating liquid 20. The calculation process is described below referring to FIG. 4.

The calculation process is performed in three steps. The first step corresponds to stress analysis. The deformation of the transparent elastic film 12 upon application of pressure from the operating liquid 20 is analyzed by means of a finite element method (FEM). The calculation is initiated on a parallel plane transparent elastic film.

The second step comprises sensitivity analysis. This step determines the degree of change in displacement, i.e. the differential coefficient for e.g. a nodal point i of the element j with a change in film thickness of an element. The differential coefficient thus obtained is the sensitivity coefficient. The sensitivity coefficient is expressed by the partial differential shown in Equation (3). The differential coefficient is obtained for each of the combinations of the element j and nodal point i.

The third step comprises the optimization of film thickness distribution. Consider a case in which the film thickness for all of the elements is changed by $\Delta t_j$. Then, the deformation $u_i^k$ of a nodal point i can be expressed by Equation (4) shown in FIG. 4 using the sensitivity coefficient obtained in the sensitivity analysis. Thus, optimization is effected in such a manner that $u_i^{k+1}$ may be equal to the required displacement $u_i^0$ for a nodal point i.

Equation (4) shows the requirement for a nodal point i. The requirements for all the nodal points can be accommodated in a matrix or sensitivity coefficient equation (5). Thus, the displacement of the film thickness by $\Delta t_j$ can be obtained by solving the matrix (5). However, Equation (4) does not hold in cases where there is a drastic change in film thickness, because the equation is based on the assumption that the film thickness changes in linear relationship with the displacement of the nodal points. In such a case, the transparent elastic film with the calculated film thickness distribution is subjected to stress analysis again to obtain the displaced shape at the given film thickness distribution. The three steps of calculation are repeated until the deformed shape converges.

Figure 5:
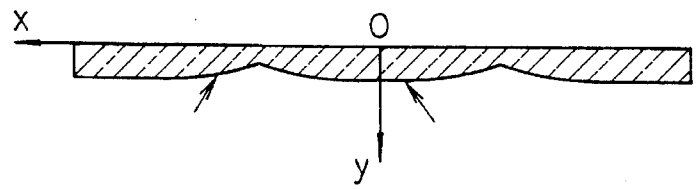
FIG. 5 is a diagram for explaining the optimal film thickness distribution derived from the calculation scheme with reference to FIG. 4.

FIG. 5 shows a transparent elastic film 12 obtained as a result of the above calculation. The result is approximated by two polynomials. Thus, the central portion of the transparent elastic film 12 is expressed approximately by a fourth order function shown in Equation (6), and the peripheral portion thereof is expressed by a fifth order function shown in Equation (7) below.

Curve A:

$$y = a_0 + a_2 x^2 + a_4 x^4 (\mu m) \quad (6)$$

where,
$a_0 = 1.8472 \times 10^{-2}$
$a_2 = -1.5204 \times 10^{-4}$
$a_4 = -3.6601 \times 10^{-5}$ Curve B:

$$y = b_0 + b_1 x^1 + b_2 x^2 + b_3 x^3 + b_4 x^4 + b_5 x^5 \quad (7)$$

where,
$b_0 = 0.25648$
$b_1 = -0.26049$
$b_2 = 0.10044$
$b_3 = -1.8134 \times 10^{-2}$
$b_4 = 1.5751 \times 10^{-3}$
$b_5 = -5.3111 \times 10^{-5}$ The film thickness distribution thus obtained is for the case in which the transparent elastic film 12 is deformed ideally under a predetermined pressure. Accordingly, the film thickness distribution thus obtained does not guarantee that the deformed shape becomes ideal when the pressure of the operating liquid 20 is changed. The results under various pressures inclusive of the pressure initially set for determining the film thickness distribution for the transparent elastic film 12 above are described below.

The deformed shapes of the transparent elastic film 12 under various pressures can be determined by the aforementioned stress analysis. A parallel incident beam 8 mm in diameter is radiated onto the lens to obtain the spot diameters listed in Table 1.

Table 1 also shows, as a comparative example, a case in which parallel transparent elastic films are used. The case having a film thickness distribution yields a spot diameter of 30 μm for a focal length in the range of from about 350 to 600 mm. This is in good contrast with a conventional case having a uniform film thickness which yields a spot diameter of about 200 μm for a comparative focal length. It can be seen that the aberration for a lens having a uniform film thickness can be reduced to about one-seventh by introducing film thickness distribution.

Figure 6A:
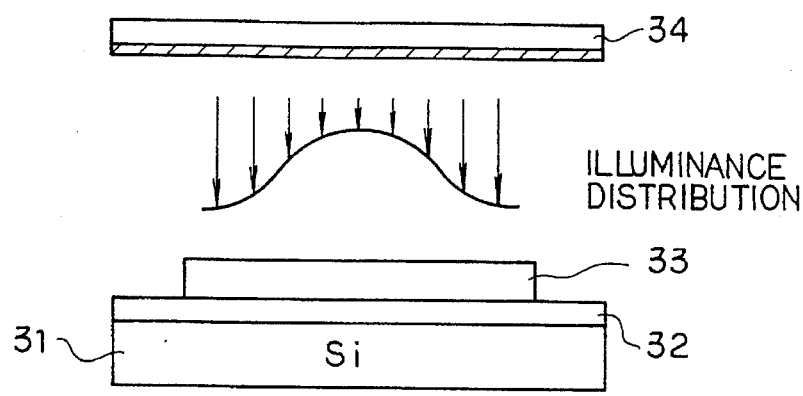
FIGS. 6A to 6C are diagrams showing schematically drawn step-sequential cross sectional structures obtained in a process for fabricating a transparent elastic film having a predetermined film thickness distribution.

The film thickness distribution can be obtained in the manner described above. A method for providing film thickness distribution in a transparent elastic film 12 is described below. Referring to FIG. 6A, a glass (Pyrex glass) 32 is anodically welded to the surface of a silicon wafer 31 that is provided as the substrate. The silicon wafer 31 and the glass 32 are each several hundreds of micrometers in thickness. The glass 32 is cut and polished thereafter to reduce the thickness thereof to a desired value of about several tens of micrometers. The cutting and polishing of the glass must be conducted with care so that the parallel planes may be maintained. The surface of the resulting glass 32 is coated with a positive photoresist 33 at a thickness corresponding to the irregularities of the film thickness distribution, and the surface of the positive photoresist 33 is then exposed to light via a photomask 34 according to the film thickness distribution.

The surface of the positive photoresist 33 can be exposed by, for example, two-dimensional scanning a laser light while changing the intensity thereof, or by imparting light exposure distribution using a dither for the photomask 34.

Figure 6B:
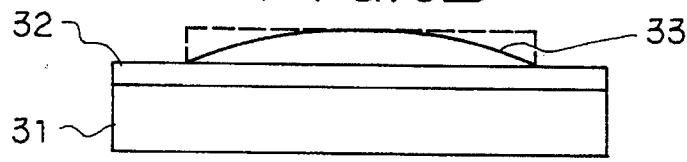
Figure 6C:
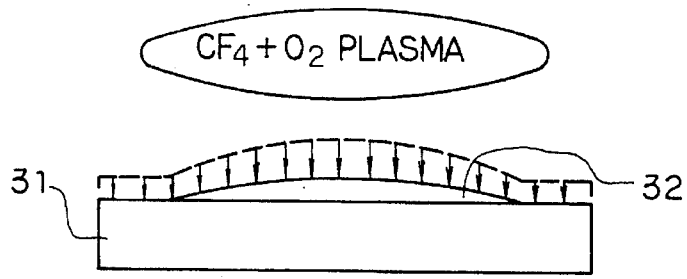

The resulting structure subjected to light exposure is developed thereafter. Referring to FIG. 6B, it can be seen that a curve corresponding to the light exposure distribution is formed on the photoresist 33. Dry etching for simultaneously etching both the photoresist 33 and the glass 32 is effected after once a curve corresponding to the film thickness distribution is formed on the photoresist 33. Oxygen and $CF_4$ are used as the etchants for the photoresist 33 and the glass 32, respectively. Accordingly, the two etchants are mixed at a proper mixing ratio and are applied at an appropriate pressure for dry etching to transfer the curve corresponding to the film thickness distribution formed on the photoresist 33 onto the glass 32. The silicon wafer 31 is then removed from the back by wet etching using KOH. Thus, a transparent elastic film having the predetermined film thickness distribution can be formed from glass.

In the embodiment above, the explanation has been made that the glass substrate 11 having a parallel plane faced to the transparent elastic film 12 which deforms by the pressure of the operating liquid does not undergo deformation. However, the substrate portion may be a thin sheet which deforms by the pressure of the operating liquid 20.

Figure 7:
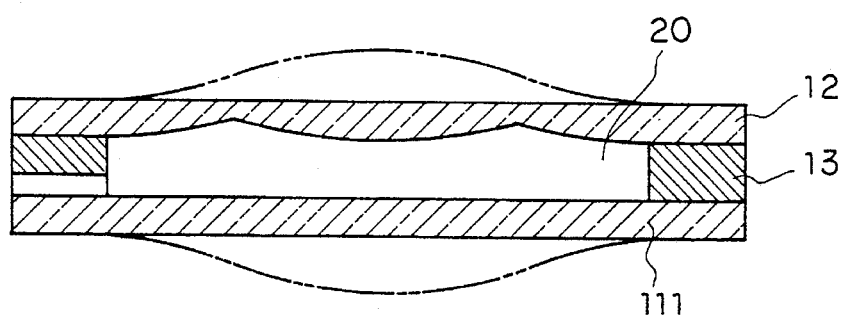
FIG. 7 is a cross sectional view of a varifocal lens according to another embodiment of the present invention.

Another embodiment based on the concept of a glass substrate which undergoes deformation is shown in FIG. 7. The glass substrate faced to the transparent elastic film 12 having a film thickness distribution is made of an elastic thin film 111 which is provided thin enough to undergo deformation. The elastic thin film has parallel planes and has no distribution in film thickness.

The film thickness distribution of a transparent elastic film 12 in the present embodiment can be determined in the following manner. The elastic thin film 111 provided as the substrate in the present embodiment undergoes morphological change upon application of a pressure by the operating liquid 20. However, it deforms not into a spherical shape and suffers lens aberration. Accordingly, an ideal deformed shape is set for the transparent elastic film 12 having the film thickness distribution as such to cancel out the aberration. Thus, the calculation scheme explained with reference to FIG. 4 can be applied according to the ideal deformed shape.

As described in the foregoing, the varifocal lens according to the present invention comprises a pressure chamber defined by a pair of transparent films and charged therein an operating liquid, so that the transparent film may be elastically deformed by the pressure of the operating liquid and thereby control the focus length of the lens. The varifocal lens according to the present invention above is characterized in that the deformed shape of the transparent film is optimized in such a manner that the lens aberration may be minimized. Thus, the present invention provides an aberration-free varifocal lens whose focal length is variably controlled by the pressure of the operating liquid. Accordingly, the varifocal lens according to the present invention is widely applicable to various optical equipments such as bar code readers.

While the invention has been described in detail and with reference to specific embodiments thereof, it will be apparent to one skilled in the art that various changes and modifications can be made therein without departing from the spirit and scope thereof.

What is claimed is:

1. A varifocal lens comprising:

a first transparent film and a second transparent film, at least one of which is made of an elastic material, said films being constructed and arranged so as to have peripheral portions thereof sealed to one another and central portions thereof spaced from one another so as to define an inner space therebetween;

an operating liquid disposed Within said inner space and having a refractive index equivalent to a common refractive index of said first and said second transparent films; and a deformation controlling structure constructed and arranged to control the pressure applied to said operating liquid so as to provide an image-forming optical system by deforming said at least one of said transparent films, and wherein said at least one of said transparent films has a thickness distribution such that the central portion thereof is circular and has a surface defining a spherical plane, such that said peripheral portion thereof has a surface defining a third order curved plane with a radius of curvature differing from that of the central portion, and such that said circular central portion thereof has its thickness increasing as it extends radially inwardly.

2. A varifocal lens as claimed in claim 1, wherein, said deformation controlling structure comprises:

a casing having an elastic film formed thereon and being connected with said inner space and charged with said operating liquid; and a pressure-applying means which applies pressure to said operating liquid inside said casing by displacing said elastic film formed on the casing.

3. A varifocal lens as claimed in claim 2, wherein said pressure-applying means has a structure such that said elastic film is displaced by electric current supplied to a coil provided on said elastic film, and the lines of magnetic force generated by a magnet provided inside said casing.

4. A varifocal lens comprising:

a first transparent film and a second transparent film, at least one of which is made of an elastic material, said first transparent film and said second transparent film having peripheral portions sealed to one another and central portions spaced from one another so as to define a pressure chamber therebetween;

an operating liquid disposed within said pressure chamber and having a refractive index equivalent to a common refractive index of said first and second transparent films; and a deformation controlling structure constructed and arranged to control a pressure applied to said operating liquid introduced into said pressure chamber, thereby controlling a variable pressure applied to said at least one of said transparent films, wherein said at least one of said transparent films has a thickness distribution such that the central portion thereof is circular and has a surface defining a spherical plane, such that said peripheral portion thereof has a surface defining a third order curved plane with a radius of curvature differing from that of the central portion, and such that said circular central portion thereof has its thickness increasing as it extends radially inwardly.

5. A varifocal lens as claimed in claim 4, wherein said film thickness distribution of said at least one of transparent films is provided as such that a spherical plane may be formed in the central portion and a third order curved plane is formed in the peripheral portion thereof.

6. A varifocal unit comprising:

a first member;

an elastic second member defining a chamber with said first member, said second member comprising a circular central portion and a peripheral portion surrounding said central portion, said central portion having a surface lying in a convex plane and said peripheral portion having a surface lying in another plane, wherein a boundary between said first and second members defines a minimum thickness of said varifocal unit; and a pressure controlling structure constructed and arranged to control a pressure in said chamber;

said central portion having a thickness which increases as it extends in a radially inward direction from said boundary; and said another plane of said peripheral portion defining a third order curved plane different from said convex plane.

7. A varifocal unit according to claim 6, wherein:

said first and second members are made of transparent material; and both said surface of said central portion lying in said convex plane and said surface of said peripheral portion lying in said another plane of said second member face said first member.

8. A varifocal unit according to claim 6, wherein:

said convex plane of said central portion defines a portion of a sphere.

9. A varifocal unit according to claim 6, wherein:

said convex plane of said central portion defines a non-spherical curved plane.

10. A varifocal unit according to claim 7, wherein:

said second member has a substantially flat surface opposite said surfaces facing said first member.

11. A varifocal unit according to claim 6, wherein:

said pressure controlling structure includes a pump positioned outside and communicating with said chamber for controlling fluid flow to and from said chamber.

12. A varifocal unit comprising:

a first member;

an elastic second member defining a chamber with said first member, said second member having a circular central portion and a peripheral portion surrounding said central portion, said central portion having a surface lying in a first curved plane and said peripheral portion having a surface lying in a second curved plane different from said first curved plane; and a pressure controlling structure constructed and arranged to control a pressure in said chamber; wherein said first and second members are made of transparent material;

a boundary defines the interface between said central and peripheral portions of said second member; and said central and peripheral portions of said second member have thicknesses which increase as they extend outwardly away from said boundary therebetween.

13. A varifocal unit according to claim 3, wherein:

said surfaces of said second member lying in said first and second curved planes face said first member; and an outer surface of said second member opposite said surfaces facing said first member lies in a flat plane.

14. A varifocal unit according to claim 12, wherein:

said peripheral portion of said second member is coupled to said first member with a boundary between said central and peripheral portions being located within said chamber.

* * * * *